United States Patent
Sekihara et al.

(10) Patent No.: US 7,708,550 B2
(45) Date of Patent: May 4, 2010

(54) COLD RUNNER INJECTION MOLD HAVING AN INSULATED GATE

(75) Inventors: Kanji Sekihara, Toyokawa (JP); Atsushi Naito, Aichi-ken (JP); Yoshihiro Okumura, Toyohashi (JP)

(73) Assignee: Konica Minolta Opto, Inc., Tokyo (JP)

( * ) Notice: Subject to any disclaimer, the term of this patent is extended or adjusted under 35 U.S.C. 154(b) by 88 days.

(21) Appl. No.: 11/168,632

(22) Filed: Jun. 28, 2005

(65) Prior Publication Data
US 2005/0287243 A1 Dec. 29, 2005

(30) Foreign Application Priority Data
Jun. 29, 2004 (JP) ............................. 2004-191835

(51) Int. Cl.
*B29C 45/73* (2006.01)
(52) U.S. Cl. .................. 425/543; 425/547; 425/552
(58) Field of Classification Search ................. 425/549, 425/562, 563, 564, 565, 566, 543, 544, 547, 425/552
See application file for complete search history.

(56) References Cited
U.S. PATENT DOCUMENTS

| | | | | |
|---|---|---|---|---|
| 3,918,870 A * | 11/1975 | Tetzlaff | ...................... | 425/543 |
| 4,239,476 A * | 12/1980 | Somberg | .................... | 425/556 |
| 4,620,958 A * | 11/1986 | Wiechard | .................... | 425/556 |
| 4,726,925 A * | 2/1988 | Binder | ...................... | 425/556 |
| 5,336,075 A * | 8/1994 | Motisi | ........................ | 425/556 |
| 6,113,383 A * | 9/2000 | Urbanek et al. | ............. | 425/595 |
| 6,245,278 B1 * | 6/2001 | Lausenhammer et al. | ... | 425/549 |
| 6,921,257 B2 * | 7/2005 | Olaru | .......................... | 425/549 |

FOREIGN PATENT DOCUMENTS

| JP | 2002-096335 | 4/2002 |
|---|---|---|
| JP | 2002-187168 | 7/2002 |

* cited by examiner

*Primary Examiner*—Tim Heitbrink
(74) *Attorney, Agent, or Firm*—Brinks Hofer Gilson & Lione

(57) ABSTRACT

An injection mold and an injection molding apparatus having a movable mold and a fixed mold. Each of the movable/fixed molds has bases, and a runner, a gate and a cavity are formed. The gate is composed of recesses made in mutually opposite end surfaces of sleeve-like heat insulators provided for the bases. Thereby, the gate is heat-insulated, and resin in the gate is prevented from cooling down during a pressure retention step. Thus, the resin keeps fluidity longer.

9 Claims, 6 Drawing Sheets

F I G. 4a
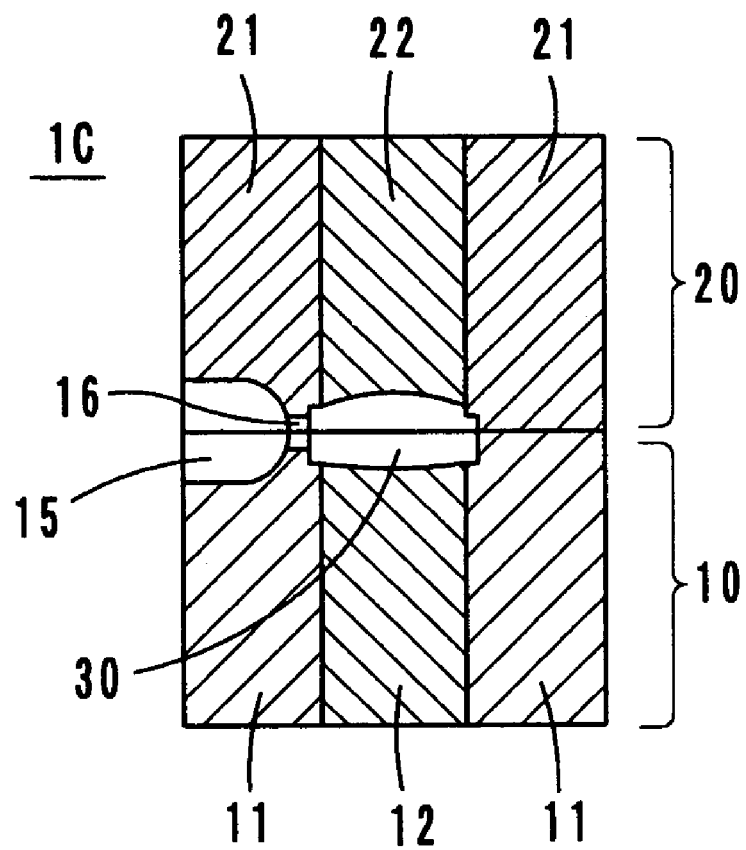
F I G. 4b
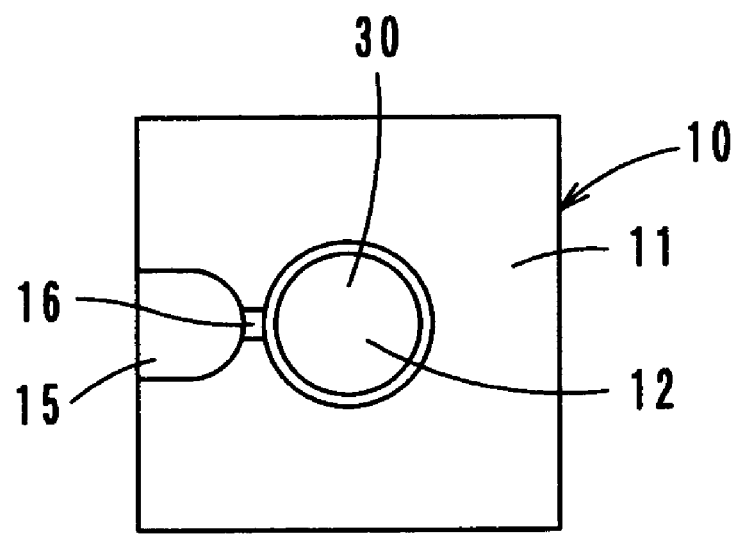

PRESENT INVENTION

▨▨▨ ABOVE GRASS-TRANSITION TEMPERATURE
☐ UNDER GRASS-TRANSITION TEMPERATURE

COLD RUNNER INJECTION MOLD HAVING AN INSULATED GATE

This application is based on Japanese application No. 2004-191835 filed on Jun. 29, 2004, the content of which is herein incorporated by reference.

BACKGROUND OF THE INVENTION

1. Field of the Invention

The present invention relates to an injection mold and an injection molding apparatus, and more particularly to an injection mold and an injection molding apparatus for molding a small and light optical element, such as a lens.

2. Description of Related Art

In recent years, with improvement of resin materials and injection molding techniques, small and light resin lenses have been developed, and a demand for use of these resin lenses as optical elements in optical pick-up devices and portable telephones has been stronger. In order to produce such resin lenses, molds which permit accurate transfer of fine configurations for diffraction elements and smooth surfaces or the like are required.

Generally, a gate of a mold is narrow, and in a pressure retention process after injection of resin into a cavity, the resin in the gate is solidified relatively early. Therefore, the pressure applied to the resin in the cavity becomes weaker, and a supply of resin to compensate shrinkage of the resin becomes short. Consequently, a molded product has problems that the accuracy of a fine configuration of a surface and the accuracy of a smooth surface are low (low transfer accuracy) and that since a tensile stress is applied to the center part of the product due to shrinkage of the resin, the birefringence of the lens becomes larger.

Japanese Patent Laid-Open Publication No. 2002-187168 discloses a mold for molding an optical element with high surface accuracy and with little residual deformation. This mold has a sliding mechanism to slide the side portions of the mold, except for the sides of the gate, so that a molded product can be released from the mold smoothly. However, this mold does not solve the above-described problems, namely, a degradation in transfer accuracy caused by solidification of resin in the gate and an increase in tensil stress caused by shrinkage of resin in the cavity.

SUMMARY OF THE INVENTION

An object of the present invention is to provide an injection mold and an injection molding apparatus which inhibit resin in a gate from cooling down so as to improve in transfer accuracy and to ease a tensile stress caused by shrinkage of resin.

In order to attain the object, an injection mold according to the present invention comprises: a cavity for molding a material; a runner for supplying the material into the cavity; a mold base, a part of which forms a gate between the runner and the cavity; and a heat insulator provided in the part of the mold base forming the gate.

An injection molding apparatus according to the present invention comprises a movable mold and a fixed mold, wherein at least one of the movable mold and the fixed mold comprises: a cavity for molding a material; a runner for supplying the material into the cavity; a mold base, a part of which forms a gate between the runner and the cavity; and a heat insulator provided in the part of the mold base forming the gate.

The heat insulator may be a sleeve-like member or a chip provided for a base of the mold or a coating formed around the gate. The sleeve-like member or the chip may be made of stainless steel, titanium alloy, nickel alloy or ceramic. The heat insulating coating may be a ceramic flame coating, a metal plating, a titanium evaporation coating or a resin coating.

Since the injection mold and the injection molding apparatus according to the present invention have a heat-insulated gate, in a pressure retention process after a resin injection process, the resin in the gate is prevented from cooling down. Accordingly, solidification of the resin in the gate is delayed. This means maintaining the fluidity of resin in the gate, which permits a further supply of resin into the cavity in order to compensate shrinkage of resin in the cavity. Therefore, the molded product has an accurate fine configuration and an accurate smooth surface, that is, the transfer accuracy is improved. Also, the tensile stress applied to the center part of the product caused by shrinkage of the resin is eased, which prevents the product (optical element) from having a large birefringence. Consequently, a product (optical element) of high performance can be obtained.

BRIEF DESCRIPTION OF THE DRAWINGS

This and other objects and features of the present invention will be apparent from the following description with reference to the accompanying drawings, in which:

FIGS. 4a and 4b show a mold according to a third embodiment of the present invention, FIG. 4a being a sectional view and FIG. 4b being a plan view of a movable mold;

DETAILED DESCRIPTION OF THE PREFERRED EMBODIMENTS

Figure 1A:
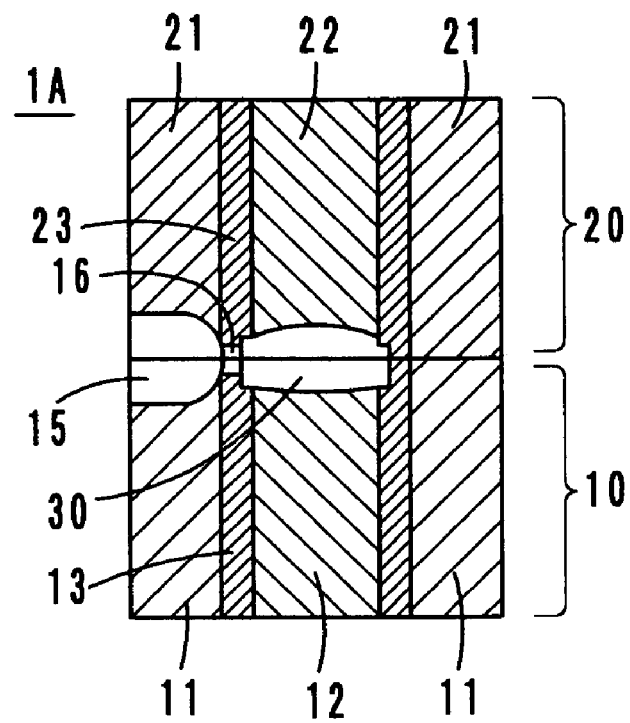
FIGS. 1a and 1b show a mold according to a first embodiment of the present invention, FIG. 1a being a sectional view and FIG. 1b being a plan view of a movable mold.

Preferred embodiments of an injection mold and an injection molding apparatus according to the present invention are described with reference to the accompanying drawings. In the drawings showing the embodiments, the same parts/members are denoted by the same reference numbers, and repetitious descriptions are avoided.

First Embodiment

Figure 1B:
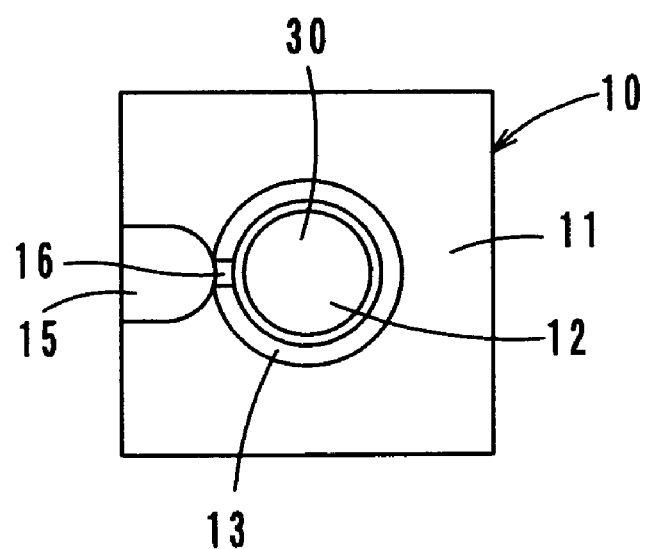
Figure 2:
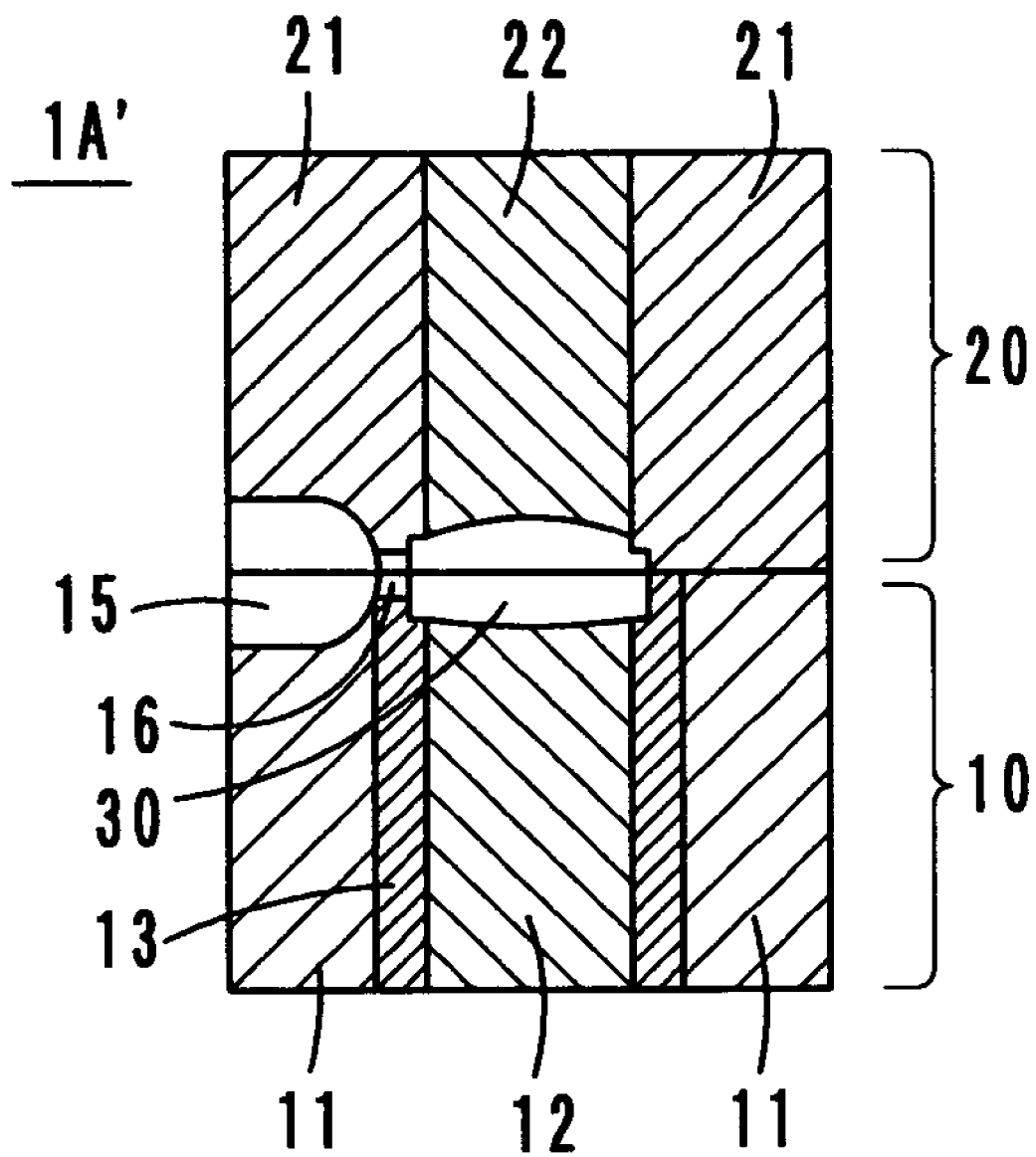
FIG. 2 is a sectional view of a modification of the mold according to the first embodiment.

See FIGS. 1a, 1b and 2

As FIGS. 1a and 1b show, a mold 1A according to a first embodiment of the present invention comprises a movable mold 10 and a fixed mold 20. The movable mold 10 comprises bases 11 and 12, and a sleeve-like heat insulator 13. The fixed mold 20 comprises bases 21 and 22, and a sleeve-like heat insulator 23. A cavity 30 is formed of mutually opposite end faces of the bases (cores) 12 and 22, and sides of the heat insulators 13 and 23.

A runner 15 is formed in the parting surface between the bases 11 and 21. A gate 16 is formed in the heat insulators 13 and 23 to be located between the runner 15 and the cavity 30. More specifically, the gate 16 is formed of recesses made in the mutually opposite end surfaces of the heat insulators 13 and 23.

The surface of the cavity 30 is finished in accordance with the configuration of a product, such as a lens, and the cavity 30 may have a surface processed layer of nickel plating.

The bases 11, 12, 21 and 22 are made of metal, such as stainless steel, which is a usual mold base material. For example, when martensite stainless steel (SUS420J2 under JIS standard) is used, the coefficient of thermal conductivity is 27 W/mK.

The heat insulators 13 and 23 can be made of various materials with lower coefficients of thermal conductivity than that of the bases 11, 12, 21 and 22, and materials with coefficients of thermal conductivity of not more than 20 W/mK are suited. For example, ferrite stainless steel (with a coefficient of thermal conductivity of 17 W/mK), austenitic stainless steel (with a coefficient of thermal conductivity of 13 W/mK), titanium alloy (Ti-6Al-4V with a coefficient of thermal conductivity of 7.5 W/mK), nickel alloy (inconel with a coefficient of thermal conductivity of 15 W/mK), silicon nitride ($Si_3N_4$ with a coefficient of thermal conductivity of 20 W/mK) which is ceramic, aluminum titanate ($Al_2O_3$—$TiO_2$ with a coefficient of thermal conductivity of 1.2 W/mK), etc. are usable as the material of the heat insulators 13 and 23. Further, other materials are usable, and various kinds of ceramic of various formulas are usable. Metals such as stainless alloy, titanium alloy and nickel alloy are suited. Organic materials (heat resistant polymer), such as polyimide resin, are also usable.

FIG. 2 shows a modification 1A' of the mold 1A according to the first embodiment. In the modification 1A', only the sleeve-like heat insulator 13 is provided for the movable mold 10, and the sleeve-like heat insulator 23 is omitted from the fixed mold 20.

The effect of the present invention, which will be described later, is obtained by providing the heat insulators 13 and 23. However, even if only the sleeve-like heat insulator 13 is provided for the movable mold 10, the same effect can be obtained. Alternatively, only the sleeve-like heat insulator 23 may be provided for the fixed mold 20.

Second Embodiment

Figure 3A:
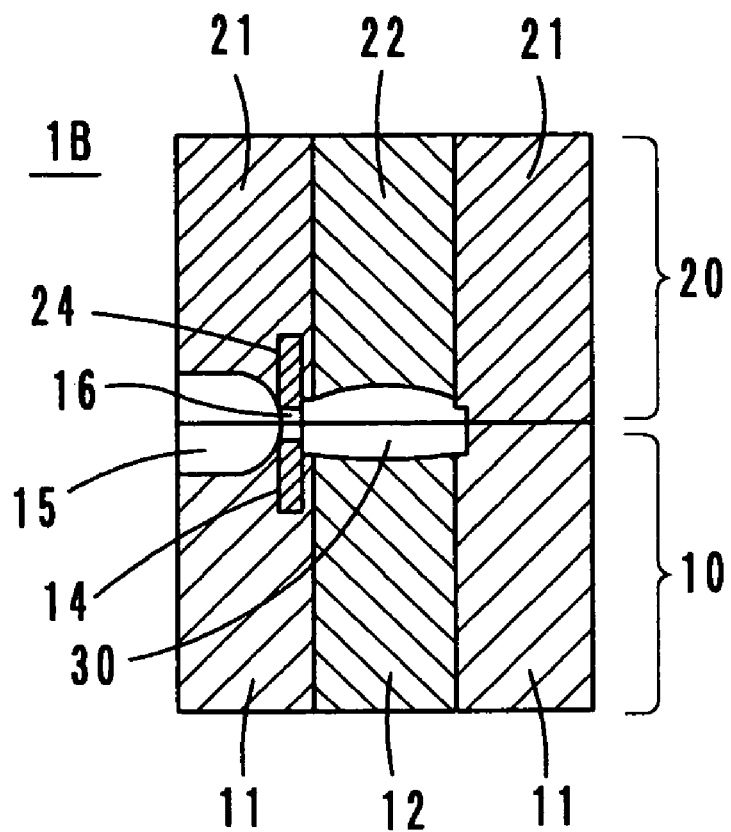
FIGS. 3a and 3b show a mold according to a second embodiment of the present invention, FIG. 3a being a sectional view and FIG. 3b being a plan view of a movable mold.
Figure 3B:
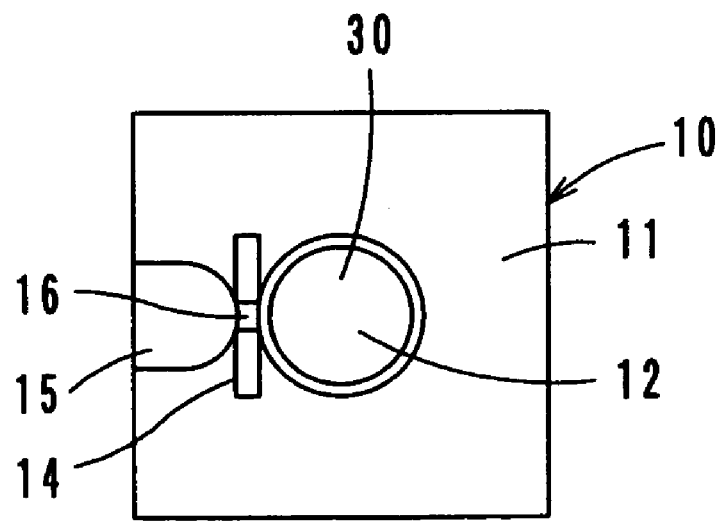

See FIGS. 3a and 3b

FIGS. 3a and 3b show a mold 1B according to a second embodiment of the present invention. As FIGS. 3a and 3b show, heat insulator chips 14 and 24 are provided in the mold bases 11 and 21, respectively. A cavity 30 is formed of mutually opposite end surfaces of the mold bases (cores) 12 and 22.

A runner 15 is formed on the parting surface of the bases 11 and 21. A gate 16 is formed between the runner and the cavity 30 of recesses made in the mutually opposite end surfaces of the heat insulator chips 14 and 24.

The bases 11, 12, 21 and 22 can be made of the materials named in the description of the first embodiment. For the insulator chips 14 and 24, materials with relatively low coefficients of heat conductivity as described in the first embodiment, such as stainless steel, titanium alloy, nickel alloy, ceramic, etc., are usable.

Like the modification shown in FIG. 2, in the second embodiment also, it is possible to provide only the heat insulator chip 14 for the movable mold 10. The effect of the present invention, which will be described later, is obtained by providing the heat insulators 14 and 24. However, the same effect can be obtained even if only the heat insulator 14 is provided for the movable mold 10. Alternatively, only the heat insulator 24 may be provided for the fixed mold 20.

Third Embodiment

See FIGS. 4a and 4b

FIGS. 4a and 4b show a mold 1C according to a third embodiment of the present invention. In the mold 1C, a gate 16 is formed of recesses made in the mutually opposite end surfaces of the mold bases 11 and 21, and the inner surface of the gate 16 is coated with a heat insulator. The heat insulator coating may be a ceramic flame coating, a metal plating such as nickel, cobalt, etc., a titanium evaporation coating such as titanium nitride or a heat resistance polymer coating such as polyimide resin (with a coefficient of heat conductivity of 0.28 W/mK). For the bases 11, 12, 21 and 22, the materials named in the description of the first embodiment are usable.

Like the modification shown in FIG. 2, in the third embodiment also, it is possible to provide the heat insulating coating only for the movable mold 10. The effect of the present invention, which will be described later, is obtained by providing the heat insulating coating. The effect can be obtained even if the heat insulating coating is provided only for the movable mold 10. Alternatively, the heat insulating coating may be provided only for the fixed mold 20.

Molding

Figure 5:
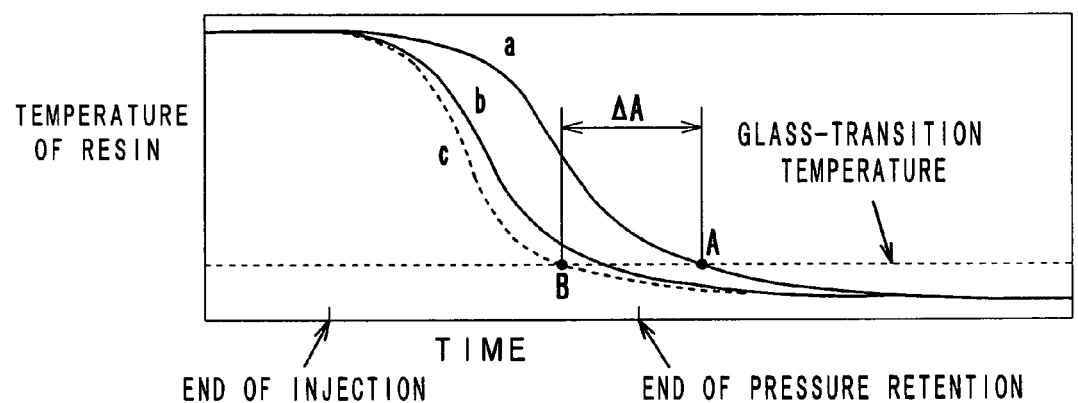
FIG. 5 is a graph showing temperature changes of resin in a mold according to the present invention during an injection molding process.
Figure 6A:
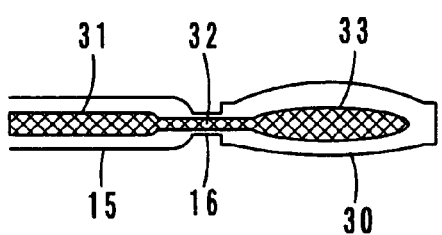
FIGS. 6a and 6b show the state of resin during a pressure retention process, FIG. 6a showing a case of using a mold according to the present invention and FIG. 6b showing a case of using a conventional mold.
Figure 6B:
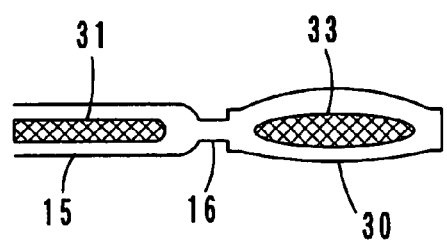

See FIGS. 5, 6a and 6b

An injection molding procedure by use of one of the above-described molds 1A through 1C is described.

FIG. 5 shows changes in temperature of resin in a mold as time passing (along the axis of abscissa). In the graph of FIG. 5, the curve a shows changes in temperature of resin in the center of the gate 16, and the curve b shows changes in temperature of resin in the center of the cavity 30. For comparison, the curve c shows changes in temperature of resin in the center of the gate of a conventional mold without any heat insulators.

First, melted resin (for example, amorphous polyolefine resin) at a specified temperature is injected from the runner 15 into the cavity 30 through the gate 16. On completion of the injection, a pressure retention step starts. The pressure retention step is a step of keeping a specified pressure applied to the resin so as to compensate shrinkage of the resin injected into the cavity 30 due to a fall in temperature. After the pressure retention step, a cooling (natural cooling) step starts. Then, when at least the surface of the resin (molded product) cools down under the temperature to cause thermal deformation, the molded product is taken out of the mold.

The temperature of the resin starts falling immediately after the injection. When a conventional mold without any heat insulators is used, as shown by the curve c in FIG. 5, in the middle of the pressure retention step, the resin in the gate 16 cools down to the glass-transition temperature (see point B) and starts to be solidified. The resin in this state is shown by FIG. 6b. The resin in the center 31 of the runner 15 and the resin in the center 33 of the cavity 30 are above the glass-transition temperature and are fluid. However, the resin in the gate 16 is solidified and has almost no fluidity, and pressure is not applied to the resin in the cavity 30. Thereby, a further supply of resin to the cavity 30 so as to compensate shrinkage of the resin in the cavity 30 is prevented. Consequently, the molded product has problems that the transfer accuracy of the surface configuration is low and that the birefringence is large due to a tensil stress applied to the center part caused by shrinkage.

On the other hand, when one of the molds 1A through 1C, which has heat insulators, is used, as shown by the curve a in FIG. 5, the resin in the gate 16 cools down to the glass-transition temperature and starts to be solidified at a point A after the pressure retention step. FIG. 6a shows the resin during the time lag □A between the point B and the point A. The resin in the center 32 of the gate 15 as well as the resin in the center 31 of the runner 15 and the resin in the center 33 of the cavity 30 are above the glass-transition temperature and are fluid.

Thus, the resin in the gate 16 keeps fluidity during the pressure retention step, and resin is further supplied to the cavity 30 through the gate 16 so as to compensate shrinkage of the resin in the cavity 30. Therefore, the molded product has a surface of high accuracy in fine configuration and in smoothness, and in other words, the transfer accuracy is high. Also, the tensile stress applied to the center part due to shrinkage of resin is eased, and the birefringence becomes smaller. Consequently, a product (an optical element) of high performance can be obtained.

In this connection, the glass-transition temperatures of exemplary amorphous polyolefine resins are specifically shown. The glass-transition temperature of ZEONEX E48R (made by Nippon Zeon Co., Ltd.) is 139° C., and the glass-transition temperature of ZEONEX 330R (made by Nippon Zeon Co., Ltd.) is 123° C. The glass-transition temperature of APEL, APL5014 (made by Mitsui Oil Chemical Industries Co., Ltd.) is 135° C., and the glass-transition temperature of ARTON FX4727 (JSR Co., Ltd.) is 125° C.

Providing a Heat Insulator Only for One of the Movable Mold and the Fixed Mold

It is preferred that heat insulators are provided for both the movable mold and the fixed mold as shown by FIGS. 1a, 1b, 3a, 3b, 4a and 4b. However, even if a heat insulator is provided only for either the movable mold 10 or the fixed mold 20 as shown by FIG. 2, it is possible to obtain an effect of inhibiting the resin in the gate 16 from cooling down.

The gate 16 is formed of recesses made in the movable mold and the fixed mold, and the sizes of the recesses are usually equal to each other. However, there is a case where the sizes of the recesses are not equal to each other. When a heat insulator is to be provided for only either the movable mold or the fixed mold, it is preferred that the heat insulator is provided for the mold with a larger recess made for the gate 16.

Other Embodiments

Injection molds and injection molding apparatuses according to the present invention are not limited to the embodiments described above. The details of the mold can be designed arbitrarily, and the materials named in the above embodiments are merely examples. In FIGS. 1a through 4b, the mold 10 and the mold 20 are a fixed mold and a movable mold respectively; however, the mold 10 may be a movable mold, and the mold 20 may be a fixed mold. Alternatively, the mold may be of a three-plate type further comprising an intermediate mold.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A cold runner injection mold comprising:
   a cavity for molding a material;
   a runner for supplying the material into the cavity;
   a mold base, a part of which forms a gate between the runner and the cavity; and
   a heat insulator formed concentrically around the gate and in contact with the gate, and configured to delay cooling of the material in the gate relative to cooling of the material in the cavity to facilitate supplying additional material to the cavity through the gate, said additional material flowing through the gate and into the cavity configured to compensate for shrinkage of the material in the cavity as the material in the cavity cools,
   wherein the mold is configured so that the material is removed from the mold after the material in the cavity, the runner, and the gate has solidified.

2. An injection mold according to claim 1, wherein the material is resin.

3. An injection mold according to claim 1, wherein the heat insulator is a chip provided for a base of the mold.

4. An injection mold according to claim 1, wherein the heat insulator is a coating formed around the gate.

5. An injection mold according to claim 4, wherein the coating is a ceramic flame coating, a metal plating, a titanium evaporation coating or a resin coating.

6. An injection mold according to claim 1, wherein the heat insulator is made of a material with a lower coefficient of thermal conductivity than that of the mold base.

7. An injection mold according to claim 1, wherein the heat insulator is made of a material with a coefficient of thermal conductivity of not more than 20 W/mK.

8. An injection mold according to claim 2, wherein the heat insulator is made of stainless steel, titanium alloy, nickel alloy or ceramic.

9. A cold runner injection molding apparatus comprising:
   a movable mold and a fixed mold,
   wherein at least one of the movable mold and the fixed mold further comprises:
      a cavity for molding a material;
      a runner for supplying the material into the cavity;
      a mold base, a part of which forms a gate between the runner and the cavity; and
   a heat insulator formed concentrically around the gate and in contact with the gate, and configured to delay cooling of the material in the gate relative to cooling of the material in the cavity to facilitate supplying additional material to the cavity through the gate to compensate for shrinkage of the material in the cavity,
   wherein the material is removed from the injection molding apparatus after the material in the cavity, the runner, and the gate has solidified.

* * * * *